United States Patent
Zhao et al.

(10) Patent No.: US 9,510,307 B2
(45) Date of Patent: Nov. 29, 2016

(54) METHOD AND SYSTEM FOR IMPLEMENTING MULTI-TERMINAL COLLABORATIVE OPERATION BASED ON A PROJECTION MOBILE HOTSPOT

(71) Applicant: ZTE Corporation, Shenzhen, Guangdong (CN)

(72) Inventors: Zhao Zhao, Shenzhen (CN); Jiannan Fu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 141 days.

(21) Appl. No.: 14/330,604

(22) Filed: Jul. 14, 2014

(65) Prior Publication Data

US 2015/0181545 A1  Jun. 25, 2015

(30) Foreign Application Priority Data

Dec. 23, 2013  (CN) .......................... 2013 1 0717985

(51) Int. Cl.
| | |
|---|---|
| *H04L 12/28* | (2006.01) |
| *H04W 56/00* | (2009.01) |
| *H04W 12/08* | (2009.01) |
| *G06F 3/14* | (2006.01) |

(52) U.S. Cl.
CPC ............ *H04W 56/0005* (2013.01); *G06F 3/14* (2013.01); *H04W 12/08* (2013.01); *G09G 2370/20* (2013.01)

(58) Field of Classification Search
CPC ..... H04W 72/04; H04W 88/02; H04W 8/14; H04W 8/18; H04W 56/00; H04W 56/001
See application file for complete search history.

(56) References Cited

U.S. PATENT DOCUMENTS

| | | | | |
|---|---|---|---|---|
| 2003/0021254 | A1* | 1/2003 | Fukuda | H04W 8/26 370/338 |
| 2006/0098174 | A1* | 5/2006 | Ohuchi | H04M 3/567 353/122 |
| 2012/0166388 | A1* | 6/2012 | Glatt | H04L 67/1095 707/610 |
| 2013/0330053 | A1* | 12/2013 | Lee | H04N 21/4852 386/201 |
| 2015/0222843 | A1* | 8/2015 | Avrahami | H04N 21/4122 386/219 |

* cited by examiner

*Primary Examiner* — Wei Zhao
*Assistant Examiner* — Sai Aung
(74) *Attorney, Agent, or Firm* — Oppedahl Patent Law Firm LLC

(57) ABSTRACT

The disclosure discloses a method and a system for implementing projection. The method comprises: connecting a router terminal having a file storage function with a projector device, establishing a projection local area network via the router terminal, and adding all collaborative terminals to the projection local area network; during projecting, establishing data synchronization between a first collaborative terminal that sends a projection file and the router terminal, and meanwhile controlling, by the router terminal, the access right of other collaborative terminals in the projection local area network on the projection file; when a second collaborative terminal needs to modify the content of the projection file, the router terminal stopping the data synchronization with the first collaborative terminal, and establishing data synchronization with the second collaborative terminal and meanwhile granting the access right of the projection file to the second collaborative terminal, so as to modify and project the projection file.

12 Claims, 2 Drawing Sheets

METHOD AND SYSTEM FOR IMPLEMENTING MULTI-TERMINAL COLLABORATIVE OPERATION BASED ON A PROJECTION MOBILE HOTSPOT

CROSS REFERENCE TO RELATED APPLICATIONS

This patent application claims priority to Chinese Patent Application No. 201310717985.5 filed on Dec. 23, 2013, the disclosure of which is hereby incorporated by reference herein in its entirety.

TECHNICAL FIELD

The disclosure relates to the field of mobile communications, and in particular to a method and a system for implementing multi-terminal collaborative operation based on a projection mobile hotspot.

BACKGROUND

Mobile hotspot, as a common indoor communication way, its technology is constantly developing; local area network (WIFI) using IEEE802.11 series protocol, low-power consumption Zigbee protocol based on IEEE802.15.4 standard and Ultra Wide Band (UWB) provide a technical basis for the development of indoor applications, and realize applications of indoor communication through features such as auto detection and ad hoc networks of indoor communication. For example, WIFI display, Digital Living Network Alliance (DLNA) and the like realize the sharing of video content in a network, through features such as high-speed transportation and ad hoc networks of indoor communication; in order to achieve a better experience effect, some networks need to do processes such as compression, while some networks can realize good technical effect without processing.

However, in the field of projection, projector device, as an important device for office study, still is used according to the traditional way, that is, a presented file is loaded into a projector device by a projection worker to achieve the purpose of learning and communication in conjunction with the interpretation of the worker, as the playing of the presented file in the projector device. Although existing technology improves the projector device to some extent, for example, adopting the way of combining with mobile phone applications, and the way of realizing access gesture sensing and combining with game applications to improve the experience of the projector device. However, if to modify the projection file, first it is needed to copy the projection file to individual terminals to modify and then to gather the modified projection files to a terminal connected with the projection device before playing. For workers participating in the projection file learning, this operation impacts the instant discussion of participants on the projection file.

To sum up, existing projection still employs a simple working mode, which can not realize instant modification during the projection process and the modified projection playing is of low efficiency.

SUMMARY

The disclosure provides a method and a system for implementing projection, which can modify a projection file instantly and improve the working efficiency of projection learning.

The application provides a method for implementing projection, including:

connecting a router terminal having a file storage function with a projector device, establishing a projection local area network via the router terminal, and adding all collaborative terminals to the projection local area network;

during projecting, establishing data synchronization between a first collaborative terminal that sends a projection file and the router terminal, and meanwhile controlling, by the router terminal, access rights of other collaborative terminals in the projection local area network on the projection file;

when a second collaborative terminal needs to modify contents of the projection file, stopping, by the router terminal, the data synchronization with the first collaborative terminal, and establishing data synchronization with the second collaborative terminal and meanwhile granting the access right of the projection file to the second collaborative terminal, so as to modify and project the projection file.

This application provides a technical solution, including: connecting a router terminal having a file storage function with a projector device, establishing a projection local area network via the router terminal, and adding all collaborative terminals to the projection local area network; during projecting, establishing data synchronization between a first collaborative terminal that sends a projection file and the router terminal, and meanwhile controlling, by the router terminal, access rights of other collaborative terminals in the projection local area network on the projection file; when a second collaborative terminal needs to modify contents of the projection file, the router terminal stopping the data synchronization with the first collaborative terminal, and establishing data synchronization with the second collaborative terminal and meanwhile granting the access right of the projection file to the second collaborative terminal, so as to modify and project the projection file. With the method and the system of the disclosure, projection conference personnel can realize modification of projection file through respective system terminal and can project the projection file through the data synchronization between the collaborative terminal and the router terminal after modification.

BRIEF DESCRIPTION OF THE DRAWINGS

For a better understanding of the technical solution of the application, drawings described hereinafter are provided to constitute one part of the specification; the drawings, together with the embodiment of the application, are used to illustrate the technical solution of the application but to limit the technical solution of the application.

DETAILED DESCRIPTION

For a better understanding of the purpose, technical solution and advantages of the application, embodiments in the application are provided below in detail in conjunction with accompanying drawings. It should be noted that the embodiments in the application and the characteristics of the embodiments can be combined if no conflict is caused.

Figure 1:
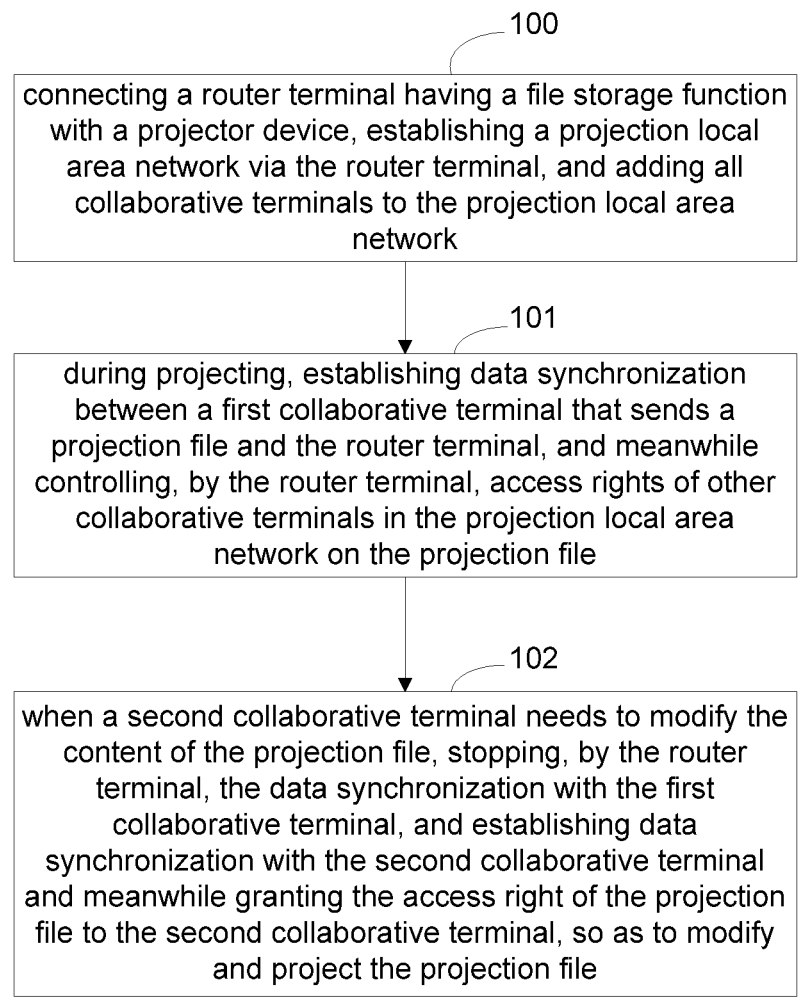
FIG. 1 is a flowchart of a method for implementing projection.

FIG. 1 is a flowchart of a method for implementing projection; as shown in FIG. 1, the method includes:

Step 100: connecting a router terminal having a file storage function with a projector device, establishing a projection local area network via the router terminal, and adding all collaborative terminals to the projection local area network.

In Step 100, the local area network is: local area network WIFI using IEEE802.11 series protocol, or low-power consumption Zigbee protocol based on IEEE802.15.4 standard, or Worldwide Interoperability for Microwave Access (WiMAX), or Ultra Wide Band (UWB), or Hybrid Fiber Coaxial (HFC), or mobile access.

The projection local area network controls all collaborative terminals through the router terminal.

It should be noted that the router terminal has the same function as the common router used at present, the only difference is that the router terminal in the disclosure has a file storage function; terminals connected to the projection local area network can be controlled by the router terminal. The function of the router terminal for establishing and managing a local area network is the commonality of the mobile hotspot in existing technology; therefore, the router terminal is the mobile hotspot of the disclosure.

Step 101: during projecting, establishing data synchronization between a first collaborative terminal that sends a projection file and the router terminal, and meanwhile controlling, by the router terminal, the access right of other collaborative terminals in the projection local area network on the projection file.

It should be noted that the method of data synchronization is the same as the data synchronization of DLNA network and the data synchronization of WIFI display in existing technology; data synchronization is the commonly used technical means for those skilled in the art.

Step 102: when a second collaborative terminal needs to modify the content of the projection file, the router terminal stopping the data synchronization with the first collaborative terminal, and establishing data synchronization with the second collaborative terminal and meanwhile granting the access right of the projection file to the second collaborative terminal, so as to modify and project the projection file.

In Step 102, the second collaborative terminal is one of the other collaborative terminals in the projection local area network other than the first collaborative terminal.

It should be noted that the first collaborative terminal can be a constantly changing network role; when the router terminal stops the data synchronization with the first collaborative terminal, it can be considered that this collaborative terminal becomes a second collaborative terminal, and the collaborative terminal which acquires data synchronization and projection file access right becomes the first collaborative terminal; this process is a relative changing process. Only if permitted by the projection conference personnel and acquiring the access right of the local area of the router terminal, a collaborative terminal can realize data synchronization with the router terminal.

The method of the disclosure further includes: after the second collaborative terminal in the projection local area network finishes the modification of projection file, the method further includes:

sending, by the second collaborative terminal, all modified files to a preset storage area;

the storage area being an e-mail, and/or a network disk, and/or an encrypted storage medium.

It should be noted that all modified files can be stored according to the sending time or different identifications set by different terminals or a default sort-order; the stored files are only for record backup of projection process or post-projection learning, and thus is not limited to any form. If necessary, the stored files can be sorted by an existing file sorting method.

Figure 2:
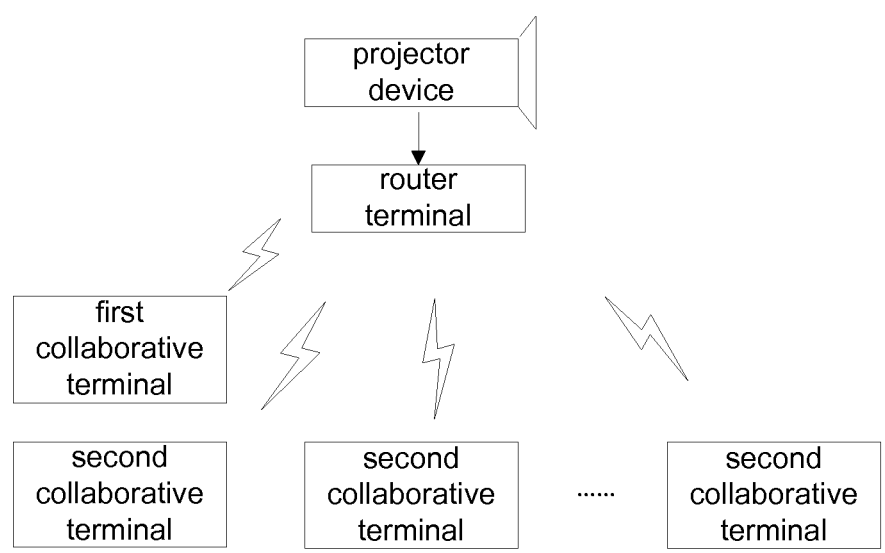
FIG. 2 is a structural diagram of a system for implementing projection.

FIG. 2 is a structural diagram of a system for implementing projection; as shown in FIG. 2, the system includes: at least one router terminal, a first collaborative terminal and at least one second collaborative terminal, wherein the router terminal has a file storage function and is configured to: connect with a projector device and establish a projection local area network, send the projection file synchronized by the first collaborative terminal to the projector device to project and control the access right of other collaborative terminals in the projection local area network on the projection file; stop the data synchronization with the first collaborative terminal, establish data synchronization with the second collaborative terminal and grant the access right of the projection file to the second collaborative terminal, when the second collaborative terminal needs to modify the content of the projection file;

the first collaborative terminal is configured to: establish data synchronization with the router terminal and send the projection file to the router terminal; and stop the data synchronization with the router terminal when the second collaborative terminal needs to modify and project the projection file; and the second collaborative terminal is configured to modify and project the projection file after establishing data synchronization with the router terminal and acquiring the access right of the projection file, when needing to modify and project the projection file.

The second collaborative terminal is one of the other collaborative terminals in the projection local area network other than the first collaborative terminal.

Further, the local area network is: local area network WIFI using IEEE802.11 series protocol, or low-power consumption Zigbee protocol based on IEEE802.15.4 standard, or Worldwide Interoperability for Microwave Access (WiMAX), or Ultra Wide Band (UWB), or Hybrid Fiber Coaxial (HFC), or mobile access.

The second collaborative terminal is configured to send the modified file to a preset storage area, after finishing the modification of projection file.

The storage area is an e-mail, and/or a network disk, and/or an encrypted storage medium.

The above embodiments provided by the present disclosure improve the modification efficiency of the projection file and improves the instant interaction between projection conference personnel in projection content learning.

Although the implementation disclosed by this application is as described above, the content is only an implementation illustrated for understanding this application, not intended to limit this application. Any technical person in the filed of this application can make any modifications and variations to the form and detail of implementation without departing from the spirit and scope of this application; however, the patent protection scope of this application should be based on the scope defined by the claims enclosed hereinafter.

The invention claimed is:

1. A method for implementing multi-terminal collaborative operation based on a projection mobile hotspot, comprising:

connecting a router terminal having a file storage function with a projector device, establishing a projection local area network via the router terminal, and adding all collaborative terminals to the projection local area network;

during projecting, establishing data synchronization between a first collaborative terminal that sends a projection file and the router terminal, and meanwhile controlling, by the router terminal, access rights of other collaborative terminals in the projection local area network on the projection file;

when a second collaborative terminal needs to modify contents of the projection file, stopping, by the router terminal, the data synchronization with the first collaborative terminal, and establishing data synchronization with the second collaborative terminal and meanwhile granting the access right of the projection file to the second collaborative terminal, so as to modify and project the projection file.

2. The method according to claim 1, wherein the second collaborative terminal is one of the collaborative terminals in the projection local area network other than the first collaborative terminal.

3. The method according to claim 1, wherein the projection local area network is: local area network WIFI using IEEE802.11 series protocol, or low-power consumption Zigbee protocol based on IEEE802.15.4 standard, or Worldwide Interoperability for Microwave Access (WiMAX), or Ultra Wide Band (UWB), or Hybrid Fiber Coaxial (HFC), or mobile access.

4. The method according to claim 1, wherein after the second collaborative terminal in the projection local area network finishes the modification of projection file, the method further comprises:

sending, by the second collaborative terminal, all modified files to a preset storage area;

the storage area being an e-mail, and/or a network disk, and/or an encrypted storage medium.

5. A system for implementing multi-terminal collaborative operation based on a projection mobile hotspot, comprising: at least one router terminal, a first collaborative terminal and at least one second collaborative terminal, wherein the router terminal has a file storage function and is configured to: connect with a projector device and establish a projection local area network, send a projection file synchronized by the first collaborative terminal to the projector device to project and control access rights of other collaborative terminals in the projection local area network on the projection file; stop the data synchronization with the first collaborative terminal, establish data synchronization with the second collaborative terminal and grant the access right of the projection file to the second collaborative terminal, when the second collaborative terminal needs to modify contents of the projection file;

the first collaborative terminal is configured to: establish data synchronization with the router terminal and send the projection file to the router terminal; and stop the data synchronization with the router terminal when the second collaborative terminal needs to modify and project the projection file; and the second collaborative terminal is configured to, when needing to modify and project the projection file, modify and project the projection file after establishing data synchronization with the router terminal and acquiring the access right of the projection file.

6. The system according to claim 5, wherein the second collaborative terminal is one of the other collaborative terminals in the projection local area network other than the first collaborative terminal.

7. The system according to claim 5, wherein the projection local area network is: local area network WIFI using IEEE802.11 series protocol, or low-power consumption Zigbee protocol based on IEEE802.15.4 standard, or Worldwide Interoperability for Microwave Access (WiMAX), or Ultra Wide Band (UWB), or Hybrid Fiber Coaxial (HFC), or mobile access.

8. The system according to claim 5, wherein the second collaborative terminal is configured to send the modified file to a preset storage area, after finishing the modification of projection file;

the storage area being an e-mail, and/or a network disk, and/or an encrypted storage medium.

9. The method according to claim 2, wherein the projection local area network is: local area network WIFI using IEEE802.11 series protocol, or low-power consumption Zigbee protocol based on IEEE802.15.4 standard, or Worldwide Interoperability for Microwave Access (WiMAX), or Ultra Wide Band (UWB), or Hybrid Fiber Coaxial (HFC), or mobile access.

10. The method according to claim 2, wherein after the second collaborative terminal in the projection local area network finishes the modification of projection file, the method further comprises:

sending, by the second collaborative terminal, all modified files to a preset storage area;

the storage area being an e-mail, and/or a network disk, and/or an encrypted storage medium.

11. The system according to claim 6, wherein the projection local area network is: local area network WIFI using IEEE802.11 series protocol, or low-power consumption Zigbee protocol based on IEEE802.15.4 standard, or Worldwide Interoperability for Microwave Access (WiMAX), or Ultra Wide Band (UWB), or Hybrid Fiber Coaxial (HFC), or mobile access.

12. The system according to claim 6, wherein the second collaborative terminal is configured to send the modified file to a preset storage area, after finishing the modification of projection file;

the storage area being an e-mail, and/or a network disk, and/or an encrypted storage medium.

* * * * *